(12) United States Patent
Dzhuraeva et al.

(10) Patent No.: US 12,165,390 B2
(45) Date of Patent: Dec. 10, 2024

(54) DYNAMIC CONFIGURATION OF A MACHINE LEARNING SYSTEM

(71) Applicant: Cisco Technology, Inc., San Jose, CA (US)

(72) Inventors: Elvira Dzhuraeva, San Jose, CA (US); Xinyuan Huang, San Jose, CA (US); Ashutosh Arwind Malegaonkar, Milpitas, CA (US); Patrick James Riel, Concord, CA (US)

(73) Assignee: Cisco Technology, Inc., San Jose, CA (US)

(*) Notice: Subject to any disclaimer, the term of this patent is extended or adjusted under 35 U.S.C. 154(b) by 398 days.

(21) Appl. No.: 17/582,959

(22) Filed: Jan. 24, 2022

(65) Prior Publication Data

US 2023/0237779 A1     Jul. 27, 2023

(51) Int. Cl.
    *G06V 10/774*     (2022.01)
    *G06V 10/776*     (2022.01)
    *G06V 10/82*     (2022.01)

(52) U.S. Cl.
    CPC ........ *G06V 10/7747* (2022.01); *G06V 10/776* (2022.01); *G06V 10/82* (2022.01)

(58) Field of Classification Search
    CPC ... G06V 10/7747; G06V 10/776; G06V 10/82
    USPC ....................................................... 382/159
    See application file for complete search history.

(56) References Cited

U.S. PATENT DOCUMENTS

| | | | |
|---|---|---|---|
| 11,874,934 B1* | 1/2024 | Rao | G06F 21/577 |
| 2011/0184896 A1 | 7/2011 | Guyon | |
| 2014/0097979 A1* | 4/2014 | Nohara | G01S 13/87 |
| | | | 342/90 |
| 2020/0082299 A1 | 3/2020 | Vasconcelos et al. | |
| 2021/0287089 A1 | 9/2021 | Mayer et al. | |
| 2023/0107622 A1* | 4/2023 | Loussides | G06N 3/09 |
| | | | 705/325 |

FOREIGN PATENT DOCUMENTS

| | | |
|---|---|---|
| WO | 1999057622 | 11/1999 |
| WO | 2011085819 | 7/2011 |

* cited by examiner

*Primary Examiner* — Jerome Grant, II
(74) *Attorney, Agent, or Firm* — Polsinelli P.C.

(57) ABSTRACT

Systems, methods, and computer-readable media are disclosed for dynamically adjusting a configuration of a pre-processor and/or a post-processor of a machine learning system. In one aspect, a machine learning system can receive raw data at a pre-processor where the pre-processor being configured to generate pre-processed data, train a machine learning model based on the pre-processed data to generate output data, process the output data at a post-processor to generate inference data, and adjust, by a controller, configuration of one or a combination of the pre-processor and the post-processor based on the inference data.

20 Claims, 5 Drawing Sheets

DYNAMIC CONFIGURATION OF A MACHINE LEARNING SYSTEM

TECHNICAL FIELD

The present technology pertains to a machine learning system, and more specifically to dynamically adjusting the configuration of a pre-processor and/or a post-processor of a machine learning system.

BACKGROUND

Machine learning (ML) has been increasingly used for various tasks across a wide variety of industries that used to be manually done by humans. Specifically, ML has automated such tasks through algorithms that draw on a large amount of data. ML is the application of artificial intelligence technology that allows applications to become more accurate at predicting outcomes. In general, ML involves the use of machine learning models, which can be trained or otherwise configured to recognize certain types of patterns and predict outcomes based on input data. For example, machine learning models can be implemented to apply complex computations to input data to generate various types of output.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed herein are systems, methods, and computer-readable media for dynamically adjusting a configuration of a pre-processor and/or a post-processor of a machine learning system.

In one aspect, a method of dynamically adjusting a configuration of a pre-processor and/or a post-processor of a machine learning system includes receiving raw data at a pre-processor, the pre-processor being configured to generate pre-processed data, training a machine learning model based on the pre-processed data to generate output data, processing the output data at a post-processor to generate inference data, and adjusting, by a controller, configuration of one or a combination of the pre-processor and the post-processor based on the inference data.

In another aspect, the method further includes generating statistical data based on the training of the machine learning model and the inference data, and adjusting the configuration of one or a combination of the pre-processor and the post-processor based on the statistical data.

In another aspect, the statistical data includes at least one of a memory usage of the inference data, a workload of the training of the machine learning model, and a resource usage of a processing unit.

In another aspect, the statistical data is generated periodically.

In another aspect, the method includes adjusting the configuration of one or a combination of the pre-processor and the post-processor based on at least one of metadata associated with the raw data, metadata associated with the output data, metadata associated with the inference data, user input, characteristics of the raw data, characteristics of the output data, and characteristics of the inference data.

In another aspect, the adjustment of the configuration is performed based on one or more configuration rules or a heuristic algorithm.

In another aspect, the machine learning model is a computer vision model.

In another aspect, the raw data is image data and the adjustment of the configuration of one or a combination of the pre-processor and the post-processor includes reducing a size of the image data.

In another aspect, the method includes adjusting the configuration of one or a combination of the pre-processor and the post-processor associated with a first end device based on the inference data associated with a second end device.

In another aspect, the pre-processed data is generated based on at least one of characteristics of the raw data, a mechanism used for generating the raw data, user requirements, contextual information associated with the raw data, characteristics of the raw data, the output data, and the inference data.

In one aspect, a system for dynamically adjusting configuration of a pre-processor and/or a post-processor of a machine learning system includes one or more computer-readable media comprising computer-readable instructions and one or more processors. The one or more processors are configured to execute the computer-readable instructions to receive raw data at a pre-processor, the pre-processor being configured to generate pre-processed data, train a machine learning model based on the pre-processed data to generate output data, process the output data at a post-processor to generate inference data, and adjust, by a controller, configuration of one or a combination of the pre-processor and the post-processor based on the inference data.

In one aspect, one or more non-transitory computer-readable media include computer-readable instructions, which when executed by one or more processors, cause the processors to receive raw data at a pre-processor, the pre-processor being configured to generate pre-processed data, train a machine learning model based on the pre-processed data to generate output data, process the output data at a post-processor to generate inference data, and adjust, by a controller, configuration of one or a combination of the pre-processor and the post-processor based on the inference data.

DESCRIPTION OF EXAMPLE EMBODIMENTS

Advanced techniques in machine learning have enabled various implementations of ML models in a wide variety of applications. These ML models run and function in a secure and robust manner to process a massive amount of data and perform complex and intensive tasks. However, generating executables and implementing such models can waste computational resources and time. In a conventional process of running a machine learning model on a device, the configuration of a pre-processor and/or a post-processor cannot be adjusted or modified based on the output of the machine learning model. Accordingly, in order to optimize the machine learning system, more specifically, to reduce latency and wasteful power, there is a need for pre-building executables of a pre-processor and/or a post-processor that can be utilized for specific use cases.

Therefore, there exists a need for a machine learning system that can dynamically adjust the configuration of a pre-processor and/or a post-processor of a machine learning system. The present technology includes systems, methods, and computer-readable media for solving the foregoing problems and discrepancies, among others. In some examples, systems, methods, and computer-readable media are provided for dynamically adjusting the configuration of a pre-processor and/or a post-processor of a machine learning system based on outputs of a machine learning model.

Figure 1:
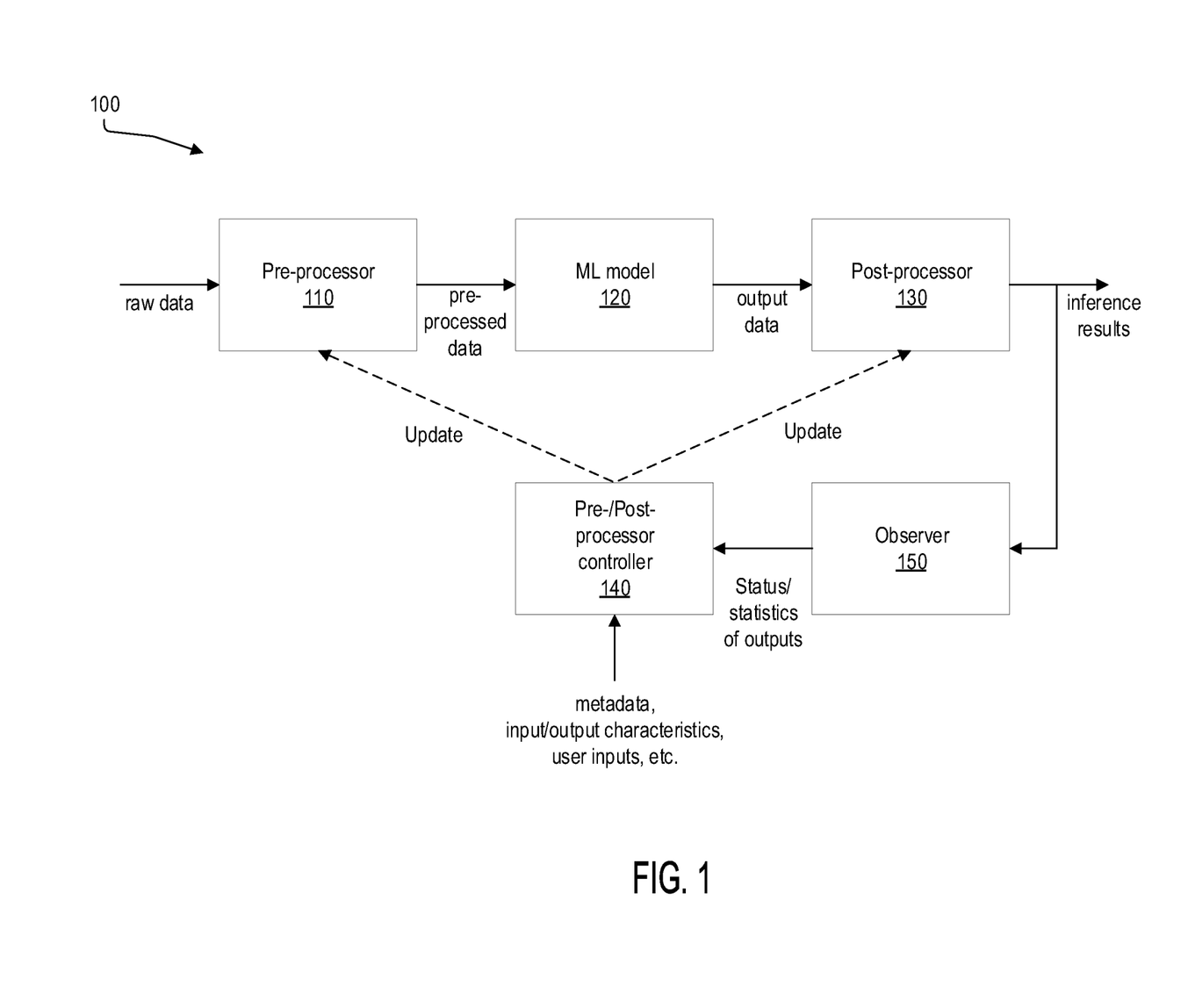
FIG. 1 illustrates a data flow diagram illustrating an example process of dynamically adjusting a configuration of a pre-processor and/or a post-processor in a machine learning system according to some examples of the present disclosure.

FIG. 1 illustrates an example machine learning system 100 of dynamically adjusting the configuration of a pre-processor and/or a post-processor based on outputs according to some examples of the present disclosure. More specifically, FIG. 1 shows a data flow diagram illustrating an example process of dynamically adjusting configuration of pre-processor 110 and/or post-processor 130 of machine learning system 100.

According to some examples, machine learning system 100 comprises pre-processor 110, machine learning (ML) model 120, post-processor 130, controller 140, and observer 150. In some examples, machine learning system 100 can comprise more or fewer components each performing some or all of the functions for which the component is described.

According to some examples, pre-processor 110 is configured to receive input data (i.e., raw data) from an end device (not shown). In some examples, the input data can include image data, audio data, or video data collected by cameras, smart cameras (e.g., cloud-managed smart cameras), sensors, or any suitable device that is capable of collecting data to be processed in machine learning system 100.

In some examples, pre-processor 110 is configured to perform pre-processing (i.e., initial manipulation of the raw data before processing by ML model 120), which includes transforming or encoding the raw data into a useful and efficient format so that the raw data can be easily interpreted by the algorithm of ML model 120 (i.e., in a manner that ML model 120 can easily parse the raw data).

In some instances, pre-processor 110 performs the pre-processing based on characteristics of the raw data such as the type of the raw data (e.g., image data, audio data, etc.) or the size of the raw data. In other cases, the pre-processing can be based on a mechanism used for generating the raw data. In some examples, the pre-processing can be based on user inputs such as user requirements. For example, when the raw data includes video data of a store and the user requires only a certain area to be captured (e.g., an entrance door), pre-processor 110 can remove or drop some data relating to the rest of the area other than the entrance door.

Also, the pre-processing can be based on contextual information associated with the raw data such as metadata associated with the raw data. In some examples, the pre-processing can be based on output data generated by ML model 120, inference data generated by post-processor 130, or any suitable information or data to transform the raw data to reduce noise, undesired latency, or unreliable outputs.

Furthermore, in some examples, pre-processor 110 can be activated by an end device other than the one feeding the raw data. For example, when a first camera detects a vehicle pulling into one of the drive-thru lanes, based on the data detected by the first camera (e.g., data determining which lane the vehicle is pulling into), the first camera can communicate with a second camera so that a configuration of the pre-processor associated with the second camera can be adjusted to focus more on a certain area (e.g., where the vehicle is pulling into).

In some examples, ML model 120 is a computer vision model where ML model 120 takes the pre-processed data from pre-processor 110 (e.g., image data or video data) and generates inference results. Examples of a computer vision model include, but are not limited to object detection, facial recognition, pattern detection, image classification, and image segmentation.

In some instances, ML model 120 takes the form of a deep neural network (DNN). A DNN is a class of machine learning models that uses multiple layers to progressively extract higher-level features from the sample data. For example, in object detection, lower layers may identify edges of an object and higher layers may identify the concepts such as letters or faces. Examples of DNN include recurrent neural networks, deep convolutional neural networks, recursive neural networks, unsupervised pre-trained networks, autoencoders, deep belief networks, generative adversarial networks, etc. A person skilled in the relevant art will recognize that any suitable machine learning model is not limited to any of the particular machine learning model types described herein.

According to some examples, post-processor 130 performs post-processing of the output data from ML model 120 and generates the inference data. In some examples, the inference data generated by post-processor 130 is in the form of structured data or semi-structured data such as JavaScript Object Notation (JSON).

According to some examples, controller 140 adjusts the configuration of pre-processor 110 and/or post-processor 130 based on the information that it receives. In some examples, such information includes static data such as metadata associated with the raw data, pre-processed data, output data, and/or inference data, input/output characteristics, and user requirements. In other examples, the information includes dynamic information collected based on real-time inputs and outputs from the data stream between pre-processor 110, ML model 120, and post-processor 130. For example, dynamic information relating to object detection can include statistics of types of detected objects, detection locations, frequencies, amounts, etc.

In some examples, controller 140 can generate a recommendation based on the inference data, statistical data, metadata, input/output characteristics, user inputs, etc. Such recommendation can be provided to a user about adjustment of the configuration of pre-processor 110 and/or post-processor 130.

According to some examples, observer 150 collects dynamic data from the data stream from pre-processor 110, via ML model 120 to post-processor 130. In some examples, observer 150 summarizes the collected data into statistical data, which can be fed into controller 140. Controller 140 can adjust the configuration of pre-processor 110 and/or post-processor 130 based on the statistical data.

In some instances, observer 150 performs the summarization of the collected data into the statistical data periodically (e.g., based on a certain time window). For example, for every 15 minutes, observer 150 can collect object detection outputs and calculate the number and frequency of each type of detected object and the location distributions.

In some examples, the statistical data includes a memory usage of the inference data (e.g., an amount of CPU consumption), workload of the training of the ML model 120 (e.g., how much stress the training of ML model 120 puts on the device), and/or resource usage of a processing unit (e.g., graphical processing unit (GPU)).

According to some examples, the adjustment mechanism can be rule-based (e.g., if-else conditions) or a heuristic algorithm (e.g., trial and error). For example, if the statistical data indicates that the consumption of CPU is over 50%, controller 140 can adjust the configuration of pre-processor 110 to provide image data in a reduced size.

Figure 2:
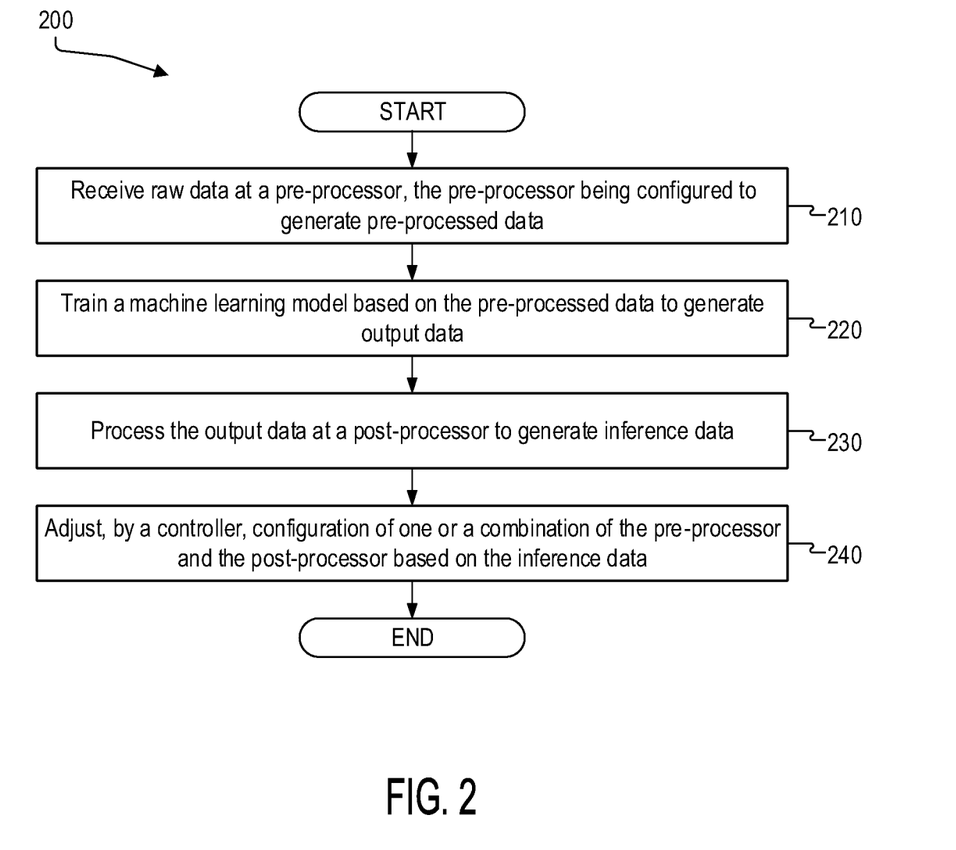
FIG. 2 illustrates a flowchart of a method of dynamically adjusting a configuration of a pre-processor and/or a post-processor in a machine learning system according to some examples of the present disclosure.

FIG. 2 is a flowchart of a method of dynamically adjusting a configuration of a pre-processor and/or a post-processor in a machine learning system according to some examples of the present disclosure. Although example method 200 depicts a particular sequence of operations, the sequence may be altered without departing from the scope of the present disclosure. For example, some of the operations depicted may be performed in parallel or in a different sequence that does not materially affect the function of method 200. In other examples, different components of an example device or system that implements the method 200 may perform functions at substantially the same time or in a specific sequence.

According to some examples, method 200 includes receiving raw data at a pre-processor at step 210. The pre-processor is configured to generate pre-processed data. For example, pre-processor 110 as illustrated in FIG. 1 receives raw data and performs pre-processing of the raw data to generate pre-processed data. The raw data in the form of text, images, video, audio, etc. may contain errors, inconsistencies, or redundant information that may cause latency or unreliable outputs. The pre-processing prepares the raw data and makes it suitable for a machine learning model so that more accurate and reliable outputs can be generated along with the downstream processes.

In some examples, the pre-processed data is generated based on at least one of the characteristics of the raw data, a mechanism used for generating the raw data, user requirements, contextual information associated with the raw data, the output data, and the inference data. For example, pre-processor 110 can perform pre-processing and generate the pre-processed data based on at least one of the characteristics of the raw data, a mechanism used for generating the raw data, user requirements, contextual information associated with the raw data, the output data, and the inference data.

According to some examples, method 200 includes training a machine learning model based on the pre-processed data to generate output data at step 220. For example, ML model 120 as illustrated in FIG. 1 can be trained based on the pre-processed data to generate output data. As previously described, the machine learning model can take the form of a deep learning neural network, which is described in detail in FIG. 3.

In some examples, the machine learning model is a computer vision model such as object detection, facial recognition, pattern detection, image classification, and image segmentation.

According to some examples, method 200 includes processing the output data at a post-processor to generate inference data at step 230. For example, post-processor 130 as illustrated in FIG. 1 can process the output data to generate inference data. In some examples, the inference data is in the form of structured data or semi-structured data such as JavaScript Object Notation (JSON).

In some examples, a deep learning neural network can be trained to make an inference (i.e., generate inference data). For example, for an object detection ML model, as each image of objects is passed to the DNN, the DNN makes an inference about what the image represents. Further details regarding the deep neural network are described with respect to FIG. 3.

According to some examples, method 200 includes adjusting, by a controller, configuration of one or a combination of the pre-processor and the post-processor based on the inference data at step 240. For example, controller 140 can adjust the configuration of one or a combination of pre-processor 110 and post-processor 130 based on the inference data. If the size of the inference data takes up too much memory space, the configuration of the pre-processor can be modified to reduce the size of an image.

According to some examples, method 200 further includes generating statistical data based on the training of the machine learning model and the inference data. For example, observer 150 can generate statistical data based on the training of ML model 120 and the inference data.

In some examples, the statistical data includes at least one of memory usage of the inference data, a workload of the training of the machine learning model (e.g., ML model 120 as illustrated in FIG. 1), and resource usage of a processing unit such as GPUs.

Further, the statistical data can analyze the data stream from the pre-processor, via the machine learning model to the post-processor and provide statistical information relating to types of detected objects, detection locations, frequencies, amounts, etc.

In some examples, the statistical data is generated periodically. For example, a time window can be set for observer 150 to analyze the collected data such as the outputs of the machine learning model or the post-processor at certain time intervals.

According to some examples, method 200 includes adjusting the configuration of one or a combination of the pre-processor and the post-processor based on the statistical data. For example, controller 140 can adjust the configuration of one or a combination of pre-processor 110 and post-processor 130.

According to some examples, method 200 includes adjusting the configuration of one or a combination of the pre-processor and the post-processor based on at least one of metadata associated with the raw data, metadata associated with the output data, metadata associated with the inference data, user input, characteristics of the raw data, characteristics of the output data, and characteristics of the inference data. For example, controller 140 can adjust the configuration of one or a combination of pre-processor 110 and post-processor 130 based on at least one of metadata associated with the raw data, metadata associated with the output data, metadata associated with the inference data, user input, characteristics of the raw data, characteristics of the output data, and characteristics of the inference data.

In some examples, the adjustment of the configuration is performed based on one or more configuration rules or a heuristic algorithm. For example, controller 140 can adjust the configuration of pre-processor 110 and/or post-processor 130 based on one or more configuration rules or a heuristic algorithm.

In some examples, when the raw data is image data, the adjustment of the configuration of one or a combination of the pre-processor and the post-processor includes reducing the size of the image data in order to reduce any wasteful use of memory or consumption of GPU.

According to some examples, method 200 includes adjusting the configuration of one or a combination of the pre-processor and the post-processor associated with a first end device based on the inference data associated with a second end device. For example, controller 140 can adjust the configuration of pre-processor 110 and post-processor 130 associated with a first end device based on the inference data associated with a second end device.

Figure 3:
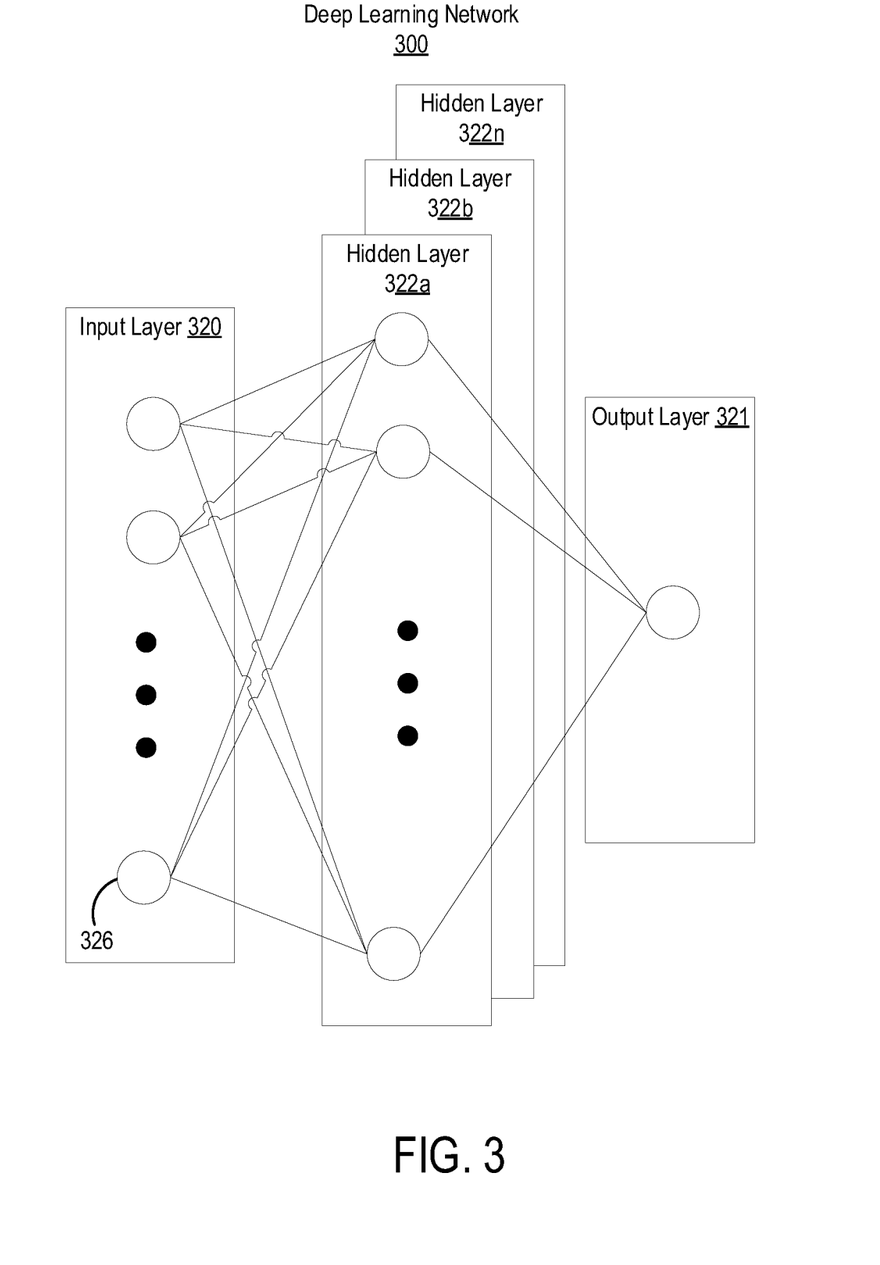
FIG. 3 illustrates an example configuration of a neural network that can be implemented to generate inference results according to some examples of the present disclosure.

The disclosure now turns to a further discussion of models that can be used through the environments and techniques described herein. Specifically, FIG. 3 is an illustrative example of a deep learning neural network 300 that can be implemented and trained to make inferences based on output data. An input layer 320 includes input data. In one illustrative example, the input layer 320 can include context information associated with a product provider provisioning a product. The neural network 300 includes multiple hidden layers 322a, 322b, through 322n. The hidden layers 322a, 322b, through 322n include "n" number of hidden layers, where "n" is an integer greater than or equal to one. The number of hidden layers can be made to include as many layers as needed for the given application. The neural network 300 further includes an output layer 321 that provides an output resulting from the processing performed by the hidden layers 322a, 322b, through 322n. In one illustrative example, the output layer 321 can provide a classification for an object in an input video frame. The classification can include a class identifying the type of activity (e.g., playing soccer, playing piano, listening to piano, playing guitar, etc.).

The neural network 300 is a multi-layer neural network of interconnected nodes. Each node can represent a piece of information. Information associated with the nodes is shared among the different layers and each layer retains information as information is processed. In some cases, the neural network 300 can include a feed-forward network, in which case there are no feedback connections where outputs of the network are fed back into itself. In some cases, the neural network 300 can include a recurrent neural network, which can have loops that allow information to be carried across nodes while reading in input.

Information can be exchanged between nodes through node-to-node interconnections between the various layers. Nodes of the input layer 320 can activate a set of nodes in the first hidden layer 322a. For example, as shown, each of the input nodes of the input layer 320 is connected to each of the nodes of the first hidden layer 322a. The nodes of the first hidden layer 322a can transform the information of each input node by applying activation functions to the input node information. The information derived from the transformation can then be passed to and can activate the nodes of the next hidden layer 322b, which can perform their own designated functions. Example functions include convolutional, up-sampling, data transformation, and/or any other suitable functions. The output of the hidden layer 322b can then activate nodes of the next hidden layer, and so on. The output of the last hidden layer 322n can activate one or more nodes of the output layer 321, at which an output is provided. In some cases, while nodes (e.g., node 326) in the neural network 300 are shown as having multiple output lines, a node can have a single output and all lines shown as being output from a node represent the same output value.

In some cases, each node or interconnection between nodes can have a weight that is a set of parameters derived from the training of the neural network 300. Once the neural network 300 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 300 to be adaptive to inputs and able to learn as more and more data is processed.

The neural network 300 is pre-trained to process the features from the data in the input layer 320 using the different hidden layers 322a, 322b, through 322n in order to provide the output through the output layer 321.

In some cases, the neural network 300 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training data until the neural network 300 is trained well enough so that the weights of the layers are accurately tuned.

As noted above, for a first training iteration for the neural network 300, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 300 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E\_total = \sum \left(\frac{1}{2}(\text{target} - \text{output})^2\right).$$

The loss can be set to be equal to the value of E total.

The loss (or error) will be high for the first training images since the actual values will be much different than the predicted output. The goal of training is to minimize the amount of loss so that the predicted output is the same as the training label. The neural network 300 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as w=w_i−η dL/dW, where w denotes a weight, wi denotes the initial weight, and η denotes a learning rate. The learning rate can be set to any suitable value, with a high learning rate including larger weight updates and a lower value indicating smaller weight updates.

The neural network 300 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 300 can include any other deep network other than a CNN, such as an autoencoder, a deep belief nets (DBNs), a Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 4:
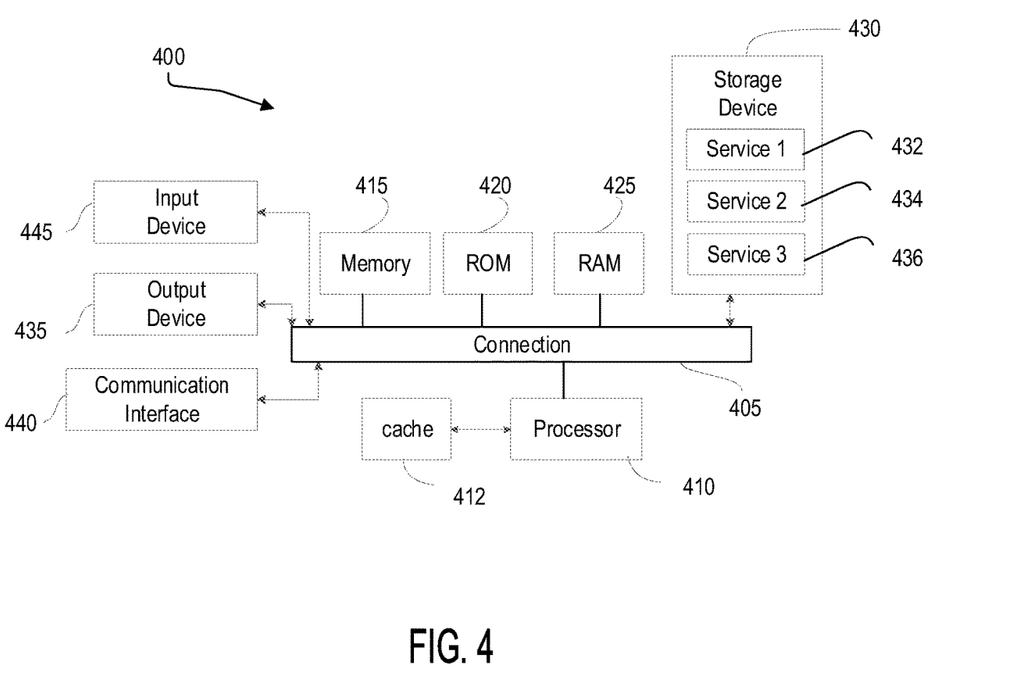
FIG. 4 shows an example computing system, which can be for example any computing device that can implement components of the system.

FIG. 4 illustrates an example computing system 400 including components in electrical communication with each other using a connection 405 upon which one or more aspects of the present disclosure can be implemented. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

Figure 5:
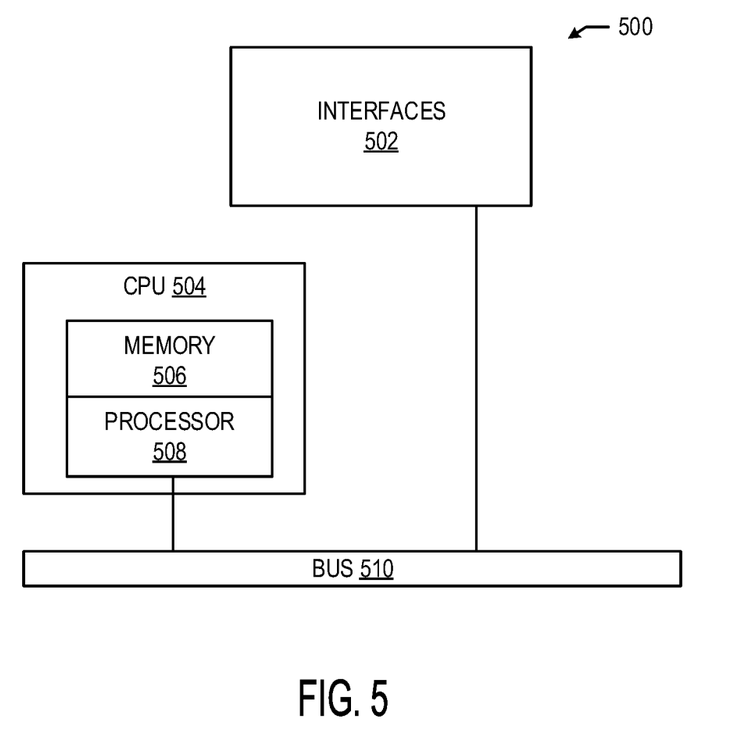
FIG. 5 illustrates an example network device.

FIG. 5 illustrates an example network device 500 suitable for performing switching, routing, load balancing, and other networking operations. Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 504 to efficiently perform routing computations, network diagnostics, security functions, etc.

Although the system shown in FIG. 5 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the bus 510, to exchange data and signals and coordinate various types of operations by the network device 500, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   receiving raw data at a pre-processor, the pre-processor being configured to generate pre-processed data;
   training a machine learning model based on the pre-processed data to generate output data;
   processing the output data at a post-processor to generate inference data;
   generating statistical data based on the training of the machine learning model and the inference data; and
   adjusting, by a controller, configuration of one or a combination of the pre-processor and the post-processor based on the inference data and the statistical data.

2. The method of claim 1, wherein the statistical data includes at least one of a memory usage of the inference data, a workload of the training of the machine learning model, and a resource usage of a processing unit.

3. The method of claim 1, wherein the statistical data is generated periodically.

4. The method of claim 1, further comprising:
   adjusting the configuration of one or a combination of the pre-processor and the post-processor based on at least one of metadata associated with the raw data, metadata associated with the output data, metadata associated with the inference data, user input, characteristics of the raw data, characteristics of the output data, and characteristics of the inference data.

5. The method of claim 1, wherein the adjustment of the configuration is performed based on one or more configuration rules or a heuristic algorithm.

6. The method of claim 1, wherein the machine learning model is a computer vision model.

7. The method of claim 1, wherein the raw data is image data, and wherein the adjustment of the configuration of one or a combination of the pre-processor and the post-processor includes reducing a size of the image data.

8. The method of claim 1, further comprising:
   adjusting the configuration of one or a combination of the pre-processor and the post-processor associated with a first end device based on the inference data associated with a second end device.

9. The method of claim 1, wherein the pre-processed data is generated based on at least one of characteristics of the raw data, a mechanism used for generating the raw data, user requirements, contextual information associated with the raw data, the output data, and the inference data.

10. A system comprising:
    one or more processors; and
    a computer-readable medium comprising instructions stored therein, which when executed by the one or more processors, cause the one or more processors to:
       receive raw data at a pre-processor, the pre-processor being configured to generate pre-processed data;
       train a machine learning model based on the pre-processed data to generate output data;
       process the output data at a post-processor to generate inference data;
       generate statistical data based on the training of the machine learning model and the inference data and
       adjust, by a controller, configuration of one or a combination of the pre-processor and the post-processor based on the inference data and the statistical data.

11. The system of claim 10, wherein the statistical data includes at least one of a memory usage of the inference data, a workload of the training of the machine learning model, and a resource usage of a processing unit.

12. The system of claim 10, wherein the instructions, which when executed by the one or more processors, further cause the one or more processors to:
adjust the configuration of one or a combination of the pre-processor and the post-processor based on at least one of metadata associated with the raw data, metadata associated with the output data, metadata associated with the inference data, user input, characteristics of the raw data, characteristics of the output data, and characteristics of the inference data.

13. The system of claim 10, wherein the adjustment of the configuration is performed based on one or more configuration rules or a heuristic algorithm.

14. The system of claim 10, wherein the instructions, which when executed by the one or more processors, further cause the one or more processors to:
adjust the configuration of one or a combination of the pre-processor and the post-processor associated with a first end device based on the inference data associated with a second end device.

15. A non-transitory computer-readable storage medium comprising computer-readable instructions, which when executed by a computing system, cause the computing system to:
receive raw data at a pre-processor, the pre-processor being configured to generate pre-processed data;
train a machine learning model based on the pre-processed data to generate output data;
process the output data at a post-processor to generate inference data;
generate statistical data based on the training of the machine learning model and the inference data and
adjust, by a controller, configuration of one or a combination of the pre-processor and the post-processor based on the inference data and the statistical data.

16. The non-transitory computer-readable storage medium of claim 15, wherein the instructions, which when executed by the computing system, further cause the computing system to:
adjust the configuration of one or a combination of the pre-processor and the post-processor based on at least one of metadata associated with the raw data, metadata associated with the output data, metadata associated with the inference data, user input, characteristics of the raw data, characteristics of the output data, and characteristics of the inference data.

17. The non-transitory computer-readable storage medium of claim 15, wherein the instructions, which when executed by the computing system, further cause the computing system to:
adjust the configuration of one or a combination of the pre-processor and the post-processor associated with a first end device based on the inference data associated with a second end device.

18. The system of claim 10, wherein the statistical data is generated periodically.

19. The system of claim 10, wherein the machine learning model is a computer vision model.

20. The system of claim 10, wherein the raw data is image data, and wherein the adjustment of the configuration of one or a combination of the pre-processor and the post-processor includes reducing a size of the image data.

* * * * *